US007471992B2

(12) United States Patent
Schmidt et al.

(10) Patent No.: US 7,471,992 B2
(45) Date of Patent: Dec. 30, 2008

(54) METHOD FOR THE AUTOMATIC CONTROL OF THE AMOUNT OF ACTIVE INGREDIENT OF TABLETS DURING THE PRODUCTION IN A ROTARY TABLET PRESS

(75) Inventors: Ingo Schmidt, Schwarzenbek (DE); Ines Andersen, Lubek (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 11/696,853

(22) Filed: Apr. 5, 2007

(65) Prior Publication Data

US 2007/0241127 A1 Oct. 18, 2007

(30) Foreign Application Priority Data

Apr. 12, 2006 (DE) ...................... 10 2006 017 196

(51) Int. Cl.
*G06F 19/00* (2006.01)

(52) U.S. Cl. ........................ 700/206; 425/148; 425/149

(58) Field of Classification Search ................. 700/206, 700/108, 109, 110; 425/148, 149; 264/40.1, 264/40.4, 410, 481

See application file for complete search history.

(56) References Cited

U.S. PATENT DOCUMENTS

| | | | | |
|---|---|---|---|---|
| 3,910,737 | A | 10/1975 | Shimada et al. | |
| 6,325,609 | B1 | 12/2001 | Shimada | |
| 2003/0090039 | A1 * | 5/2003 | Ghebre-Sellassie et al. | 264/489 |
| 2005/0200038 | A1 * | 9/2005 | Vogeleer et al. | 264/40.1 |

FOREIGN PATENT DOCUMENTS

| | | | |
|---|---|---|---|
| DE | 25 02 098 | | 8/1975 |
| DE | 43 15 680 | A1 | 11/1994 |
| EP | 1 600 761 | A1 | 5/2004 |
| EP | 1 568 480 | A2 | 12/2004 |
| EP | 1 584 454 | A2 | 2/2005 |
| JP | 61-111799 | | 5/1986 |

OTHER PUBLICATIONS

"Nondestructive and ON-line Monitoring of tablets using light-Induced Fluorescence Technology", Chee Kong Lai, AAPS PharmSciTech 2004.*

* cited by examiner

*Primary Examiner*—Paul L Rodriguez
*Assistant Examiner*—Nathan Laughlin
(74) *Attorney, Agent, or Firm*—Vidas, Arrett & Steinkraus, P.A.

(57) ABSTRACT

Method for the automatic control of the amount of active ingredient of tablets during the production in a rotary tablet press, which has a die table with die bores, upper and lower punches assigned to the die bores, a filling station, a metering cam for the lower punches in the filling station, at least one pressing station with at least one upper and one lower pressing roller, wherein at least the lower pressing roller is adjustable with respect to the other pressing roller by means of a pressing roller adjustment equipment, a metering cam adjustment equipment for height adjustment of the metering cam, a compression force measuring equipment at the pressing station, a control and operating computer and an active ingredient measuring equipment, characterized by the following procedural steps: during the tablet production, the amount of active ingredient of tablets is measured and values for the amount of active ingredient are compared with a predetermined desired active ingredient value in the control and operating computer, and the metering cam is adjusted in accordance with the deviation of the measured amount of active ingredient from the desired active ingredient value.

5 Claims, 1 Drawing Sheet

METHOD FOR THE AUTOMATIC CONTROL OF THE AMOUNT OF ACTIVE INGREDIENT OF TABLETS DURING THE PRODUCTION IN A ROTARY TABLET PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Rotary tablet presses are commonly known; a rotor with an as the case may be segmented die table contains bores on a partial circle, to which lower and upper punches are assigned, which are controlled in their position by means of cam elements. In a pressing station, which has at least one upper and one lower pressing roller, the pressing material filled into the die bores is pressed to a tablet with the aid of the punches (when there is spoken from a tablet above and below, this has not necessarily to be a pharmaceutical tablet, but it may be a pressed article from any arbitrary pressing material, which contains certain active ingredients or contents which develop an effect when being applied). Usually, the produced tablets have to meet certain quality standards, like weight, hardness, height and so on. It is known to take samples of the tablet production for checking them with regard to the individual criterions in external testing devices, which are arranged next to a tablet press, or even in more remote laboratories. As the measurement times per tablet are relatively long with regard to the output of a tablet press (100 tablets per second), only random samples can be examined.

The filling of the die bores or the bores of segments, respectively, takes place via a suitable filling system, a feeder shoe for instance, wherein the amount of pressing material in the die bores depends from the position of the lower punches. It is therefore known to provide a metering cam in a station in the region of the filling station, which determines the position of the lower punches, and with it the amount to be accommodated in the die bores. When the latter is to be changed, adjustment of the metering cam takes place via a suitable adjustment equipment.

The punches are pressed with a predetermined force against the pressing material in the pressing station. This force is measured. It is also known to keep the compression force at a predetermined value by comparing the measured compression force values with a desired value. When the measured compression force value (usually the maximum one) differs from the desired value, the metering cam is adjusted in order to increase or to decrease the amount which is filled in. Thus, the tablet is produced with a constant weight of mostly constant height (cylindrical height). The regulation of the compression force takes place via a suitable control circuit, which includes the control and operating computer of the tablet press. It is commonly known to operate such tablet presses with a control and operating computer.

An essential quality criterion in the production of tablets is the amount of active ingredient and/or of the amount of excipients. This is particularly valid for pharmaceutical tablets. It has to be made certain that the tablets have a constant amount of active ingredient. Even for this case, it is known to take random samples and to measure the content of active ingredient.

There are different measurement methods for measuring the content of active ingredient of tablets, like HPLC (High Performance Liquid Chromatography), NIRS (Near Infrared Spectroscopy) or LIF (Laser Induced Fluorescence Spectroscopy).

The present invention is based on the objective to provide a method for the production of tablets with the aid of a rotary tablet press, by which it is made possible to keep the amount of active ingredient of tablets automatically constant during the production, within predetermined limits, either absolutely or relatively, with respect to the tablet weight.

BRIEF SUMMARY OF THE INVENTION

In the invention, the amount of active ingredient is measured and compared with a desired value for this amount. In case of a deviation from the desired value, either more or less of the active ingredient per die bore is added via the filling material, by adjusting the metering cam, for instance.

The change of the filling amount results in a change of the compression force, because during tablet production, the compression forces at the lower and upper pressing roller, respectively, are measured, and the control and operating computer compares the compression force measurement values with a predetermined value of the compression force, in a manner per se known. According to one embodiment of the present invention, adjustment of the lower pressing roller takes place via the assigned pressing roller adjustment device in accordance with the deviation of the measured amount of active ingredient from the desired value. The compression force measured thereafter deviates then from its desired value. This deviation changes the filling amount until the compression force deviation from the desired value is about zero again. In other words, in accordance with the deviation of the measured amount of active ingredient from the desired value of active ingredient, the lower or the upper pressing roller is adjusted, a too small amount of active ingredient causing an adjustment of the pressing rollers away from each other and a too large amount of active ingredient causing an adjustment of the pressing rollers towards each other, only one pressing roller having to be adjusted in doing so.

Variations of the ratio of the active ingredient in the powder amount to be pressed can be caused by upstream mixing procedures, the procedure of filling into smaller containers or by de-mixing, the latter by vibrations directly in the tablet press, for instance. As there is an immediate connection between the weight of a tablet and the amount of active ingredient thereof, a change of the absolute amount of active ingredient of the tablets can be produced by changing the metering of pressing material in the die bores of the rotor. The consequence is an acceptable weight change of the tablets in order to compensate a lack or an excess of the amount of active ingredient.

In the invention, the amount of active ingredient can be detected by an on-line measuring device, for instance, using the NIRS or the LIF method, e.g. In the running production, the sample tablets are automatically fed to the active ingredient testing device. Here, the active ingredient is measured, digitalised and is transmitted via an arbitrary computer interface to the control and operating computer of the machine as an up-to-date real value. After a desired/real-comparison, the latter can automatically perform a necessary correction of the metering amount of the pressing material, by changing the position of a pressing roller in the pressing station for instance, another real value of the compression force being established through this. The deviation between desired value and real value of the compression forces is compensated by a corresponding correction of the height-adjustable metering cam. This has the consequence that the weight of the tablets changes and through this also the amount of active ingredient thereof. The compression force and thus the hardness of the tablets is kept constant, however.

According to one embodiment of the present invention, the active ingredient measuring equipment detects the weights of the tablets also, and the control and operating computer compares the ratio of the amount of active ingredient to weight with a predetermined desired ratio value for active ingredient content and weight. Through this, the weight and thus, the amount of active ingredient of the tablet can be adjusted in relation to weight via the described automatic control.

According to a further embodiment of the present invention, the measurement of the amount of active ingredient takes place inside the tablet press, with the already mentioned methods, for instance.

The present invention is explained in more detail in the following, by means of an example of its realisation.

DETAILED DESCRIPTION OF THE INVENTION

Figure 1:
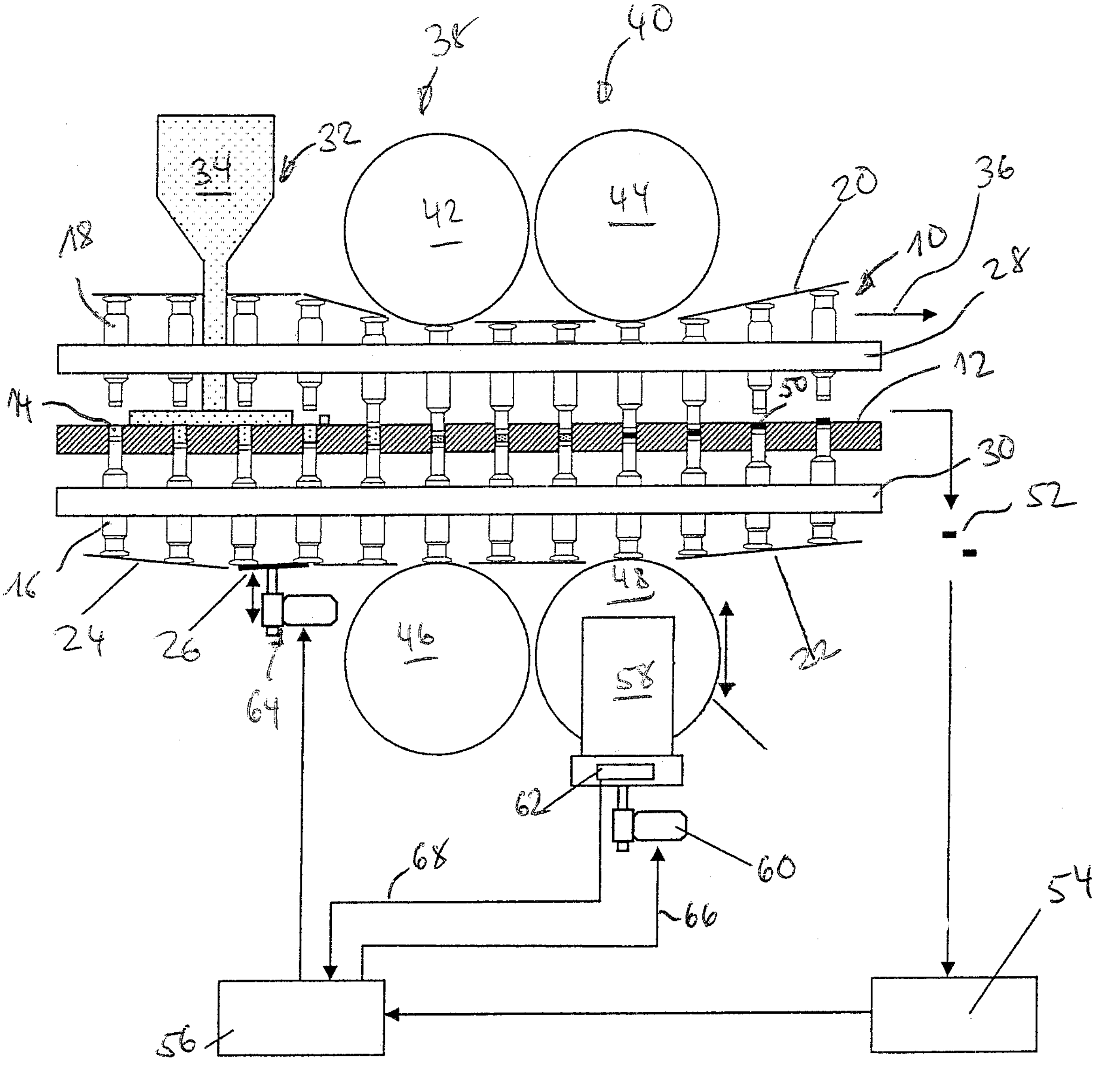
FIG. 1 shows schematically a part of a rotary press for the production of tablets, with an automatic control of the active ingredient content of the tablets.

While this invention may be embodied in many different forms, there are described in detail herein a specific preferred embodiment of the invention. This description is an exemplification of the principles of the invention and is not intended to limit the invention to the particular embodiment illustrated In FIG. 1, a dismantled rotor 10 of a rotary tablet press is represented in a schematic manner. It contains a die table 12 with die bores 14, to each one of which one lower punch 16 and one upper punch 18 is assigned. The pressing punches are guided by individual guiding cam elements 20 and 22, respectively. They will not be described in detail, with the exception of a filling cam element 24 and a metering cam element 26. Besides, the rotor 10 contains punch guideways 28 and 30, respectively. A filling station 32 is assigned to the rotor, which subsequently fills pressing material 34 into individual die bores 14. Such equipments are commonly known and will not be explained in more detail. The filling cam element 24 for the lower punches 16 takes care that the lower punches have a predetermined position during filling. The metering cam element 26 causes a minimum lifting of the lower punches after the filling process, through which the definite amount which is to be accommodated by the die bores 14 is predetermined. In the production direction, which is indicated by an arrow 36, two pressing stations 38 and 40, respectively, are arranged behind the filling station 32, each one with an upper pressing roller 42 and 44, respectively, and a lower pressing roller 46 and 48, respectively. Thus, 38 is the pre-pressing station and 40 the main pressing station. With the aid of the pressing stations 38, 40, the pressing material 34 in the die bores 14 is pressed to a tablet. Downstream in the production direction after the main pressing station 40, the upper punches 18 are drawn back and the tablets 50 are ejected with the aid of the lower punches 16 and the ejection cam 22. Subsequently, stripping them off from the upper side of the die table 12 takes place, which is not shown, however.

At 52 it is wanted to indicate that one or some of the produced tablets 50 are branched off to a checker device 54 for active ingredient and/or weight. The digitalised values for the amount of active ingredient of the tablets and the weight thereof from the checker device are given up to a control and operating computer 56, which for the rest is also otherwise controlling or automatically controlling, respectively, the operation of the tablet press.

The pressing rollers 42, 44 and 46 are drawn so as to be stationary in the figure. Normally, the pressing rollers are realised as to be shiftable in height. The pressing roller 48 is mounted in a guideway 58, also as being shiftable in height, and can be adjusted with respect to the upper pressing roller 44 with the aid of a pressing roller adjustment equipment 60, in order to change the cylindrical height of a tablet and/or to vary the compression force.

Besides, a compression force measuring equipment 62 is assigned to the lower pressing roller 48, the values of which are given up to the control and operating computer 56 in a digitalised form.

The metering cam element 26 is also adjustable in the height with the aid of a metering cam adjustment equipment 64. Through this, the amount of the pressing material to be filled into the die bores 14 is changeable.

In the control and operating computer 56, the value for the measured amount of active ingredient is compared with a desired value. When the measured value differs from the desired value, a signal in accordance with the control deviation is given up to the pressing roller adjustment equipment 60 via the function line 66, which adjusts the pressing roller. Through this, the compression force measuring equipment 62 measures a changed compression force. This measurement is given up to the control and operating computer 56 via the function line 68. The control and operating computer compares the measured compression force value with a desired compression force value. In the case of a deviation, an actuating signal in accordance with the control deviation is given up to the metering cam adjustment equipment 64, through which the amount filled into the die bores 14 is changed.

When the amount of active ingredient is too small, the pressing roller 48 is moved downward by the adjustment equipment 58. Through this, the actual compression force is diminished. The control deviation of the compression forces, which is detected in the control and operating computer 56, leads to an adjustment of the metering cam 26, through which the actual compression force approaches the desired compression force again. When the amount of active ingredient is too big, it is proceeded in a reverse manner, i.e. adjustment of the pressing roller 48 towards the upside takes place. The compression force difference established thereafter leads to a decrease of the material that is filled in, so that actual and desired values of the compression force approach each other again.

As has been already mentioned, the amount of active ingredient can be measured and automatically controlled absolutely. However, it is also possible to measure and automatically control the ratio to weight, thus the proportion of the active ingredient.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. Method for the automatic control of the amount of active ingredient of tablets during the production in a rotary tablet press, which has a die table with die bores, upper and lower punches assigned to the die bores, a filling station, a metering cam for the lower punches in the filling station, at least one pressing station with at least one upper and one lower pressing roller, wherein at least the lower pressing roller is adjustable with respect to the other pressing roller by means of a pressing roller adjustment equipment, a metering cam adjustment equipment for height adjustment of the metering cam, a compression force measuring equipment at the pressing station, a control and operating computer and an active ingredient measuring equipment, characterised by the following procedural steps:

during the tablet production, the amount of active ingredient of tablets is measured and measured values for the amount of active ingredient are compared with a predetermined desired active ingredient value in the control and operating computer and the control and operating computer determines a deviation of the measured amount of active ingredient from the desired value, during the tablet production, the compression forces on the lower and/or upper pressing roller are measured, the control and operating computer compares the measured values of the compression force with a predetermined desired value of the compression force and determines a deviation, the lower pressing roller is adjusted in accordance with the deviation when there is a deviation of the measured amount of active ingredient from the desired value, and the metering cam is adjusted in accordance with the deviation of the compression force values.

2. Method according to claim 1, characterised in that the active ingredient measuring equipment measures also the weight of the tablets, and the control and operating computer compares the relation of a measured amount of active ingredient to the weight with the relation of a predetermined desired value for the amount of active ingredient to the weight.

3. Method according to claim 1, characterised in that the measurement of the amount of active ingredient is performed in the tablet press.

4. Method according to claim 1, characterised in that the measurement of the amount of active ingredient and of the weight of the tablets is performed in an external device.

5. Method according to claim 1, characterised in that the measurement of the amount of active ingredient is performed by a Near Infrared Spectroscopy (NIRS) or a Laser Induced Fluorescence Spectroscopy (LIF) method.

* * * * *